(12) United States Patent
Sisk et al.

(10) Patent No.: US 12,115,473 B2
(45) Date of Patent: Oct. 15, 2024

(54) PRESSURE AND HEAT MOLDED POLYMER TUBE WITH INTERLOCKING GROMMET

(71) Applicant: Bulk Tank, Inc., Park Hills, MO (US)

(72) Inventors: David E Sisk, Bonne Terre, MO (US); Peter Kemp, Crestwood, MO (US); Roger Breakfield, Farmington, MO (US); Andrew Boyer, Bonne Terre, MO (US); Travis Kinneman, Fredericktown, MO (US); Todd Watkins, Farmington, MO (US); Dylan Whitter, Bonne Terre, MO (US)

(73) Assignee: Bulk Tank, Inc., Park Hills, MO (US)

( * ) Notice: Subject to any disclaimer, the term of this patent is extended or adjusted under 35 U.S.C. 154(b) by 51 days.

(21) Appl. No.: 17/803,495

(22) Filed: Aug. 5, 2022

(65) Prior Publication Data

US 2023/0182044 A1    Jun. 15, 2023

Related U.S. Application Data

(63) Continuation-in-part of application No. 17/803,420, filed on Jun. 28, 2022, and a continuation-in-part of application No. 17/803,366, filed on May 28, 2022, and a continuation-in-part of application No. 17/300,958, filed on Dec. 22, 2021.

(60) Provisional application No. 63/259,681, filed on Aug. 3, 2021, provisional application No. 63/259,341, filed on Jul. 12, 2021, provisional application No.
(Continued)

(51) Int. Cl.
*B01D 29/13*    (2006.01)
*B01D 29/11*    (2006.01)

(52) U.S. Cl.
CPC ............ *B01D 29/13* (2013.01); *B01D 29/111* (2013.01); *B01D 2201/0415* (2013.01); *B01D 2201/18* (2013.01)

(58) Field of Classification Search
CPC .................. B01D 29/13; B01D 29/111; B01D 2201/0415; B01D 2201/18; B01D 46/0005; B01D 46/58; B01D 50/20; B01D 50/16; B01D 46/2407; B01D 2265/024; B01D 2271/02; B01D 46/02; B01D 63/068; B01D 63/069; B04C 3/06; B04C 2009/004; B01C 9/00
USPC .......... 55/490, 294, 350.1; 264/DIG. 48, 41, 264/125
See application file for complete search history.

(56) References Cited

U.S. PATENT DOCUMENTS 3,680,287 A * 8/1972 Wood, III ............ B01D 46/521
55/529
5,053,063 A * 10/1991 Sisk ....................... B01D 46/00
55/378
(Continued)

*Primary Examiner* — Robert A Hopkins
*Assistant Examiner* — Qianping He
(74) *Attorney, Agent, or Firm* — Sandberg Phoenix & von Gontard, P.C.

(57) ABSTRACT

A pressure and heat molded polymer tube, formed of miniscule polyethylene beads, each in the vicinity of 115 um powder in diameter, which when compression molded forms pores that are of uniform diameter throughout their length within the range of 5 um-10 um, the tube having an upper flange, that mates within a correspondently shaped grommet, which when applied to the transverse plate of an air filtration housing, functions to cleanse highly efficiently the dust particles and debris from the air being filtered, when passing through the filtration system, so that such purified air can be discharged safely.

20 Claims, 5 Drawing Sheets

Related U.S. Application Data

63/205,694, filed on Jan. 4, 2021, provisional application No. 63/473,712, filed on Jun. 18, 2022, provisional application No. 63/361,510, filed on Dec. 30, 2021.

(56) References Cited

U.S. PATENT DOCUMENTS

| | | | | |
|---|---|---|---|---|
| 5,377,750 A | * | 1/1995 | Arterbury | E21B 43/10 166/228 |
| 2013/0125754 A1 | * | 5/2013 | Johnson | B01D 46/04 95/278 |
| 2015/0182897 A1 | * | 7/2015 | Ji | B01D 46/60 55/302 |
| 2019/0232205 A1 | | 8/2019 | Kadavy et al. | |

* cited by examiner

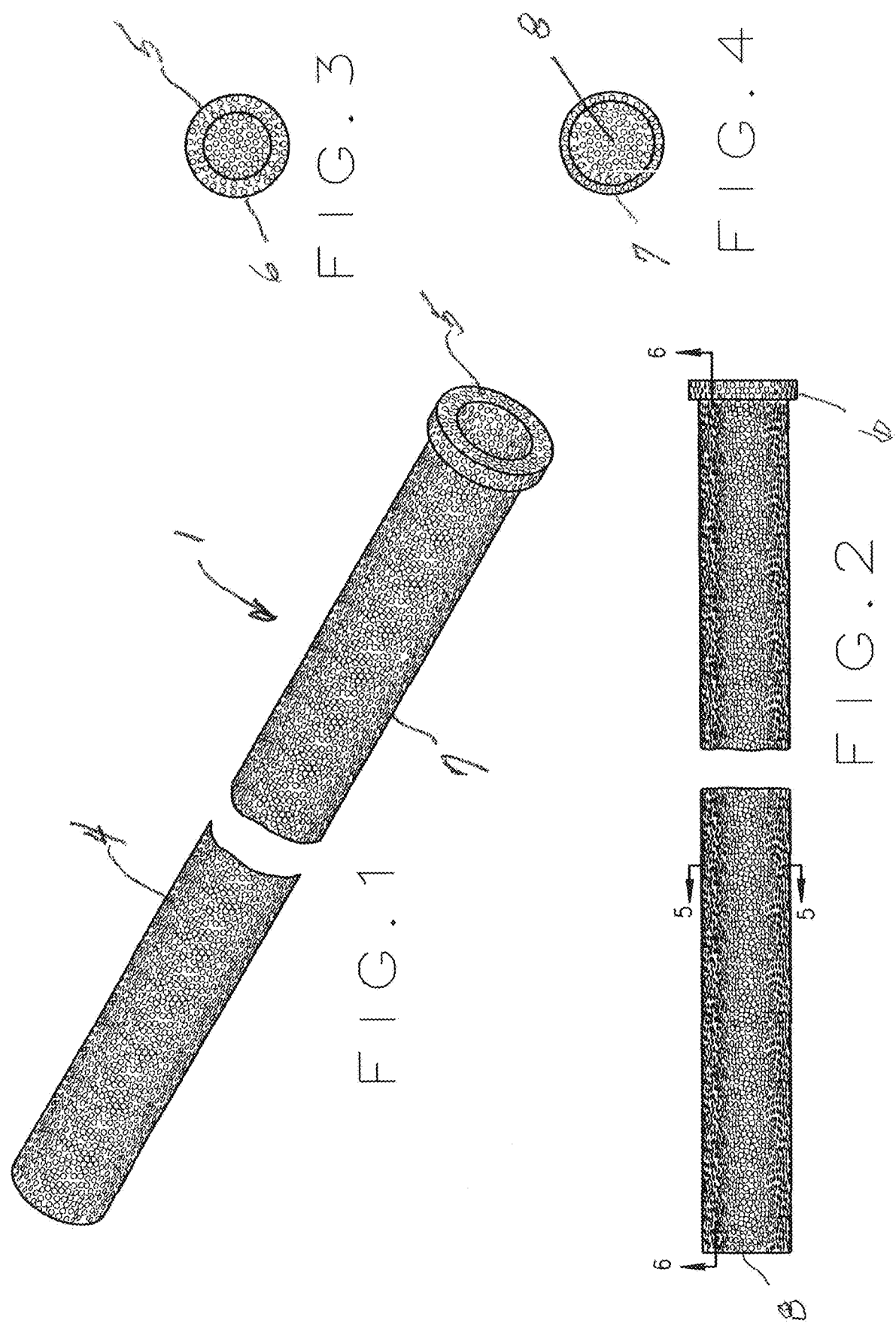

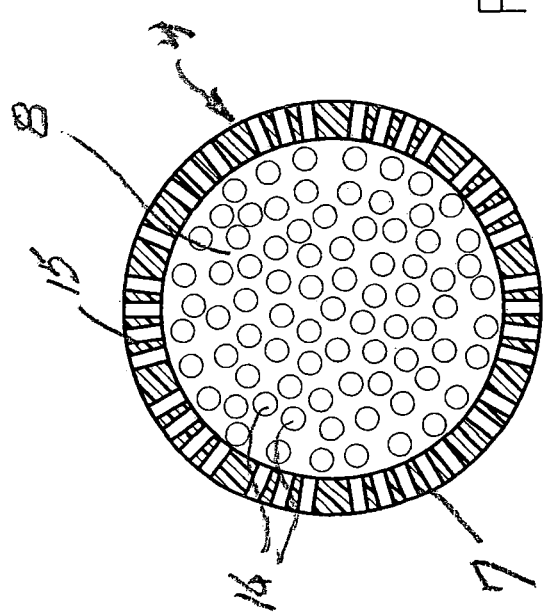
FIG. 5
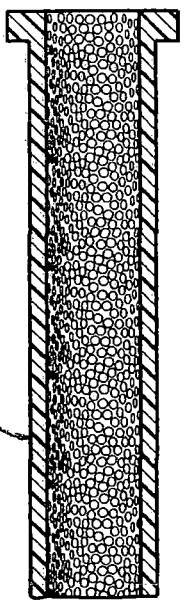
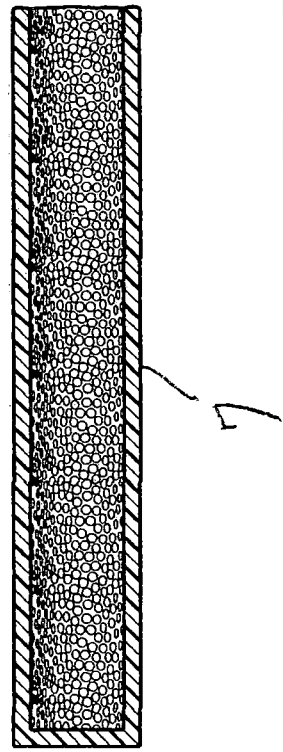
FIG. 6

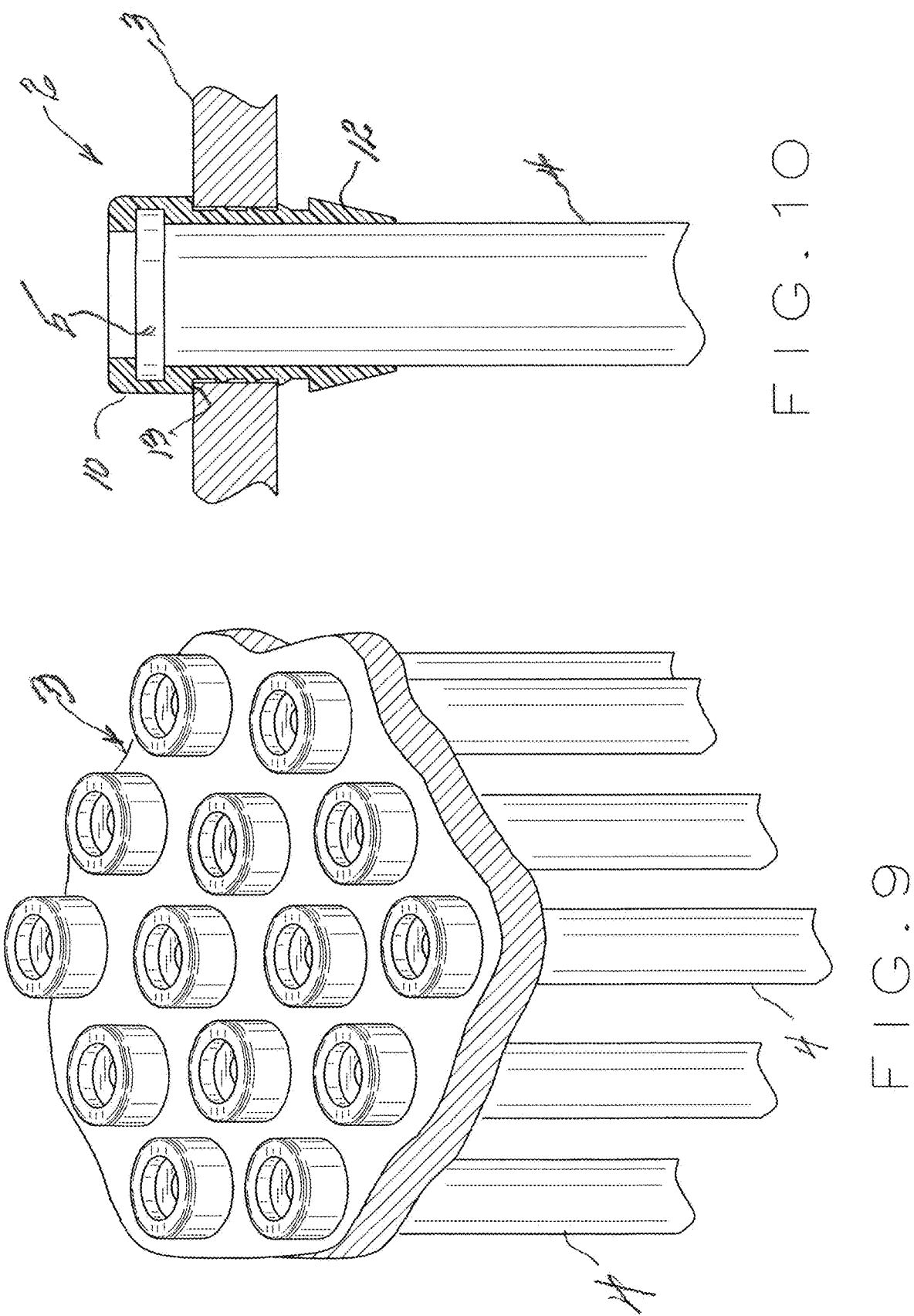

PRESSURE AND HEAT MOLDED POLYMER TUBE WITH INTERLOCKING GROMMET

CROSS-REFERENCE TO RELATED APPLICATIONS

This application is related to a provisional application filed on Jun. 16, 2002, under Ser. No. 63/473,712; this application is a continuation-in-part of the patent application filed on Nov. 22, 2021, under Ser. No. 17/300,841, and which application is a non-provisional of the provisional application filed on Dec. 3, 2020, under Ser. No. 63/205,346; this application is a continuation-in-part of the patent application filed on Dec. 22, 2021, under Ser. No. 17/300,958, and which application is a non-provisional for the application filed on Jan. 4, 2021, under Ser. No. 63/205,694; this application is a continuation-in-part of the patent application filed on May 28, 2022, under Ser. No. 17/803,366, which application is the non-provisional for the application filed on Jun. 29, 2021, under Ser. No. 63/259,341; this application is the continuation-in-part of the patent application filed on Jun. 28, 2022, under Ser. No. 17/803,420, which application is the non-provisional for the application filed on Aug. 3, 2021, under Ser. No. 63/259,681; this application is related to the application filed on Dec. 30, 2021, under Ser. No. 63/361,510.

FIELD OF THE INVENTION

This invention relates to the cleansing of air that is utilized in the conveyance of granular and powdery material during its conveyance by a vehicle, or to the site of storage, or vice versa, wherein the air is filtered through the use of an air filtration system that incorporates uniform pressure and heat molded polymer tubing that is designed to incorporate uniform miniscule pores to prevent dust passage during the air filtration process when used within the conveyance of granular and powdery materials. The molded polymer tubes have such fine uniform pores that dust particles cannot penetrate through the tubing, but the air being filtered can, and as a result, because of its molding, the outer surface of the tube(s) remain very compact and smooth, notwithstanding the capability of filtering air passing therethrough, during usage, so while the air is being cleansed, the dust particles will descend from the outer surface of the filtration tube(s) during such usage, and not penetrate or clog the tubes during usage. The tube(s) are particularly formed at their upper and lower ends, with the upper end cooperating with a specially designed grommet, for holding such tubes within the upper transverse plate that is provided within the filtration housing of the air filtration system.

BACKGROUND OF THE INVENTION

The present invention relates to a dust filtering and collection system, and more particularly relating to the filtration tube(s) that are utilized within the system, and the type of grommet that is used to secure the tube(s) to their transverse plate embodied within the filter housing of the device. The present tube(s) are pressure and heat molded from a polymer, such as polyethylene, as distinct from the previous method for forming such filtration tube(s), by molding a flat sheet of the polymer, cutting it into strips, and then cylindrically folding it over to form a seam that is sealed, in order to form the basic structure of the filtration tube(s) of the prior art type of filtration system. These systems are generally utilized in the bulk tank industry, as apply to those vehicles that are used for transporting very fine granular materials, or powdery type materials, particularly that which may be used in the food industry, and which must remain unadulterated during their entire conveyance process, and until the moment of usage in forming food products, or other related specialized products.

In the prior art, where the filtration tubes were formed from sheet material, usually, when rolled into the cylindrical form, and the heat seal was applied to the seam, to form a sealed connection between the two lateral edges of the forming tube, the upper part of the cylindrical tube would be crimped over, to form a type of flange, but one that was not too structurally sound when applied to the filtration housing during usage. Furthermore, the bottom of the formed tube(s) would be crimped over, heat sealed, and would not form a part of the filtration system for the entire tube structure.

These types of prior art tubes were generally obtained from the manufacturer, and were identified as the branded name of Porex, for usage for filtering systems. But, when air under significant pressure is applied into the filtration housing, for passage through the Porex tubes, the pores of such rolled tubes were of significant size, at least at their entrance, and normally would also allow the entrance and passage therethrough of some of the powdery dust, entrained within the pressurized air that was being cleansed, by the filtration system. Also, such dust would accumulate on the outer surfaces of the tubes. When such pressures were encountered, and after significant time of usage, the seam sealed along the side edge of the tube(s) would eventually crack or break, or separate, because of the exposure to such significant air pressures. Furthermore, the bottom of such crimped tubes did not contain sufficient or any pores to allow the air to be filtered at that location, which reduced the efficiency of the air filtration, by the filter housing, during its application and usage. Furthermore, since the upper end of the rolled filter tube(s) were simply crimped over, as a means for holding the upper end of the tube(s) to the transverse plate, of the filter housing, such crimped upper end of the tube(s) when exposed to excessive pressures, would have a tendency to uncurl, allowing the tube(s) to be forced out of a connection within the transverse plate, which resulted in a total failure of the filtration system, and the air remaining adulterated, when the powdery material was conveyed further for application and usage in the food or other related manufacturing process.

In the prior art, it has been determined that the polymer powders that were used to form the sheet material, for eventually rolling in the tubular form, utilized such beads or powders in the approximate 250,um or micron size, which when such was rolled into the tubular form, it formed the filtration tube(s) as previously described, and would normally create a nominal pore size in the range of 20,um to 40 um, in their formation, and for use for filtration processes, as known in the prior art. These types of rolled tubes have been used in the prior art as long as thirty-five years. Thus, when the nominal pore size of the older style filtration tubes were formed in that range of 20,um to 40,um, it was found that a fair amount of fine dust particles would pass through the filtration tubes, within the filter housing, and remain entrained within the conveying air, that was used for the transfer of the granular materials or for food grade or powders being conveyed to a site of usage or storage.

When forming these prior art type of tubes, the polymer beads utilized, of the size range as previously explained, normally was not subjected to pressure or compression molding, but was simply molded into sheet form, in preparation for further processing into the tubular configuration, as aforesaid. Hence, it was found that rolled end of the prior art tubes normally formed of length a length, particularly at the upper flared edges that were used for forming a type of flange that would be held by an early style grommet to the tube transverse sheet. Furthermore, by utilizing a welded seam, or heat sealed seams along the entire length of the forming tubes, it was found to reduce approximately seven percent of the filter media area, as compared to the design for the pressure molding the tubes, of this current invention. Furthermore, at the bottom end of the formed tubes, the end material was fully melted, when crimped, thereby eliminating the end area for filtration purposes, which would eliminate another one to two percent of the total area for use for processing and filtering of the incoming air.

To reiterate, and more specifically, in the dry bulk conveyance of granular or powdery material, such as grains, starch, flour, and the like, where various suction lines and vacuums are generated to provide for the conveyance of such materials, to and from a silo, tank trailer, railroad car, or other dry bulk trailers, it has always been essential that the cleanliness of the air being used in the conveyance system, be highly sanitized, so as to avoid damaging the blower used to pressurize the air for the products being conveyed. Additionally, dust and particulate materials that pass through the filter pores, or through splits or ruptures in the side wall of the filter tubes, is then discharged to the surrounding environment, which presents an explosion hazard and an inhalation hazard for workers who are present. But, with the prior art type of porous tubes, of the type as previously explained, it was found that dust particles do filter through such earlier tubes, and can yet adulterate the conveying air, utilized in the direct transfer of grains in the transportation process.

Furthermore, with the prior art style of filtration tubes, incorporating much larger pores, that fine dust particles would build within the pores of such tubes, which would reduce the efficiency of the air filtration process, during usage of the air conveyance system.

Heretofore, some of the inventors herein have obtained earlier patents upon the means for cleansing of the conveying air to be used in the conveying of food grade and related granular bulk materials. Such could be seen in U.S. Pat. No. 5,053,063, upon a dust filtering and collection system, as noted therein. This shows the overall assembly of the various structures making up the entire storage tank of the dry bulk trailer, including its elongated storage tank, dust filtering and collection canister associated therewith, and its sheet formed or rolled filtration tubes provided within the canister, in addition to the various flow paths for the various air lines that provided for conduct of the dust laden air stream from the canister, to the filtration device, and the other flow lines associated with the conveyance of what was believed to be purified air to the primary discharge line that utilizes pressurized air to convey the granular material for unloading from the tank trailer, to the site of its usage or storage. That disclosure provides an overall analysis of the bulk tank vehicle storage tank, its various air conveying lines, and the filtration device used then, during its processing of granular material. The type of tubes utilized in the identified embodiments included the rolled style of polymer formed tubes, having a Teflon surface, in an effort to try to make the tubes more compatible with the filtration of dust laden air, and to provide for separation of the surface dust filtered by the tubes, and cause its particles to fall and be accumulated in the bottom area of its shown canister. The crimping of the bottom of said tubes can be seen in that earlier patent. These tubes were generally identified as the Porex type of rolled sheet formed tubes.

Another United States patent to one of the inventors herein, U.S. Pat. No. 8,657,898, depicts an air filter spin flow inlet/outlet housing, which shows a separate type of structure for filtering of the air used in the conveying of bulk granular material from a tank trailer, such as the type that also uses air pressure to achieve the required granular flow, and its distinct air filtration unit incorporating an intake that includes a spiral type of flow, upon entering of its associated filtering device.

The concept of the current invention is to provide for formation of the filtration tube(s) utilized in the air filtration system of a bulk tank granular material conveying type of system, that provides for a more efficient cleansing of the air from the tank trailer, laden with such granular type powdery grain materials, so as to reduce the discharge of dust through the blower and further to the environment around the tank trailer, and lessen its incidents of clogging or premature deterioration, such as fracturing of its tube seams, and to provide for greater efficiency in the separation of any dust particles from the air being treated.

These are examples of prior art known to the Applicants of these improvements to air filtration means, particularly for use with bulk tank trailer conveying vehicles, or other conveying vehicles, when used for the purposes as identified for the invention herein.

SUMMARY OF THE INVENTION

The concept of this invention is to provide for improvements in the filtration structures provided for purifying the air that is used for conveying granular or powdery material being conveyed by a tank trailer, railroad car, and any other vehicle that conveys such material utilizing pressurized air as a means for providing transportation to such materials in preparation for their conveyance or usage before it is then discharged to atmospheric pressure near the dry bulk trailer. More specifically, the invention relates to the compression molding of polymer tubes incorporating very miniscule pores in the range of 5-10 microns, in dimension, throughout their length, that effectively allows the air to be passed through the filtration tubes, cleanse such air of any dust particles, which remain upon the outside surface of the filtering tubes, during performance of this operation. And, because the porosity of such tubes is very miniscule, the outer surface of the tubes remain relatively smooth, and prevents the adherence of any dust particles upon their surface, allowing such particles to descend and be collected for further usage or disposal. While the invention further visualizes the usage of the backflow concept of air in order to purge the tubes of any dust particles, since almost all dust particles remain upon the outer surface of these tubes, then the very miniscule filter pores that extend through the tubes to perform the filtration process are very small, and normally do not accept the entrance of the dust particles, the backflow of such air for cleansing purposes is of minimal need, but yet capable of performance, if required and desired by the operator.

The invention further directs attention to the upper end of the filtration tubes, wherein instead of crimping the tubes at the upper ends, for purposes of their weak mounting within a grommet, in the current embodiment, the upper ends of the tubes are integrally molded with a flange, rather squared off of construction, and which can fit complementary within a particularly formed grommet, that provides for complete seating of the tubes, within their grommets, as each grommet is applied to the transverse tube supporting plate of the filter housing, during installation. The grommet includes a cylindrical portion, having one or more barbs at its bottom end, in order to bias against the inner or bottom surface of the supporting transverse plate, while the upper end of the grommet has an integrally formed boss, like a flanged structure, extending widthwise, that biases against the top surface of the supporting plate, during installation. In addition, there are a series of shaped extensions formed around the intermediate surface of the grommet, and which functions as comparable to O-rings when this portion of the grommet is forcefully contiguously inserted into the associated transverse plate, and the edge of its continuous aperture, so that the grommet is firmly sealed in place, within the plate, prevents the exit of any filtering air, as during performance of a filtration operation. Furthermore, interiorly of the boss like flange provided at the upper end of the grommet, interiorly thereof, is a corresponding groove, having a complementary shape to the upper flange of the tube, so that once the tube is inserted within the grommet, and its flange seats within the groove, it provides for a locked association between the grommet, its tubes, as when applied into the associated transverse plate, during installation.

The concept of the invention is to provide for the means for preventing the blowout of the filtration tubes, their breakage or severing of any longitudinal seams, as would occur with prior art types of filtration tubes, and furthermore, to provide a plurality of the mounting of such grommet supported tubes, within a single plate, during installation and usage. It is envisioned that the transverse plate may support hundreds of such tubes, in a larger filtration housing structured setting, when used for filtering the air that is processed and utilized in the conveyance of granular materials, by the type of vehicles, as previously explained.

It is, therefore, the principal object of this invention is to provide the structural cooperation between a specially pressure and heat molded polymer tube, its associated and supported grommet, all of which can be installed within the transverse plate of a filtration housing, and through its structural relationship, avoid any inadvertent or premature structural damages, and thereby sustain the useful life of the associated filtering components, when installed within the filter housing of an air filtering system.

Another object of this invention is to provide the formation of a pressure molded polymer tubing, generally formulated from polyethylene, being formed of very miniscule beads, during the molding process, and thereby substantially reduce the irregular pores that extend through such tubes, to prevent the entrance of dust, but to allow the passage of the cleansing air, during an air filtering operation.

Another object of this invention is to provide a pressure and heat molded polyethylene tube, for use for filtering purposes, wherein its miniscule pores only have dimensions within the range of 5-10 microns, in their structure. Such is usually of smaller dimensions than the size of the granular material or dust particles that may be entrained within the incoming air, that is being filtered, through the operations of the filtration system of this invention.

Another object of this invention is to provide an interengagement or interlocking of various components that make up the filtration system of this invention, by providing a grommet that is specially designed to accommodate the locking of the upper end of the flanged filtration tube within its interior, and wherein the grommet can then interlock with the edge of the transverse plate aperture, in which it locates, and thereby prevent any inadvertent displacement of the tube, or its grommet, from the plate, when subjected to elevated pressures of the incoming air that is being cleansed through the usage of this system.

Another object of this invention is to provide a polymer tube, for the purpose of filtering dust particles entrained within the air passing through the tube, during a filtering procedure, and wherein the outer surface of the tube is relatively smooth, can retain the filtering dust particles thereon, and then allow for the release and descent of such particles, during and after completion of the air filtering process.

Another further object of this invention is to provide for the usage of very small beads of polymer, usually polyethene, within the range of 90-130 microns, and which when molded under elevated heat and pressures, forms the filtration tube that has miniscule and uniform pores, even smaller than the dust particles being treated, in order to have very highly efficient filtration of the passing air, being cleansed through usage of the system of this invention.

Another object of this invention is to provide for a flanged filtration tube, that has very distinct edges for its integral flanged construction, and which can be effectively gripped by the associated grommet, when the tube is installed within the grommet, and applied to the transverse plate of the filtration housing. This prevents a premature rupture of the tube, or its separation from the grommet, when subjected to the elevated pressures of the incoming air being cleansed, through usage of this system.

These and other objects may become more apparent to those skilled in the art upon review of the Summary of the Invention as provided herein, and upon undertaking a study of the Description of its Preferred Embodiment, in view of the Drawings.

BRIEF DESCRIPTION OF THE DRAWINGS

In referring to the drawings:

FIG. 1 is an isometric view of the pressure and heat molded polymer tube of this invention;

FIG. 2 is a side view thereof;

FIG. 3 is a top view;

FIG. 4 is a bottom view;

FIG. 5 is an enlarged sectional view of the tube taken along the line 5-5 of FIG. 2;

FIG. 6 is a longitudinal sectional view taken along the line 6-6 of FIG. 2;

FIG. 9 shows a plurality of the grommet supported molded filtration tubes applied to a portion of a transverse plate of the filtration system;

FIG. 10 is a sectional view of the grommet and supporting transverse plate showing holding in an interlock relationship of the upper end of the filtration tube within its associated grommet;

DESCRIPTION OF THE PREFERRED EMBODIMENT

Figure 7:
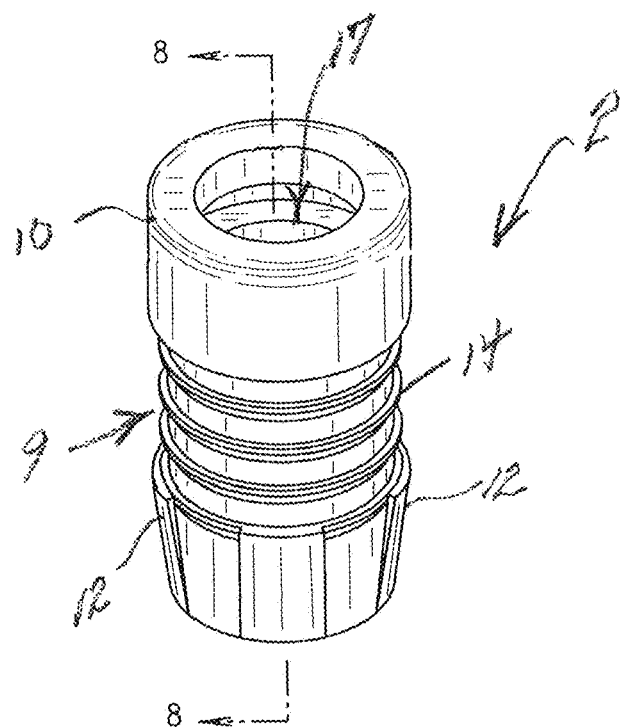
FIG. 7 is isometric view of the grommet that holds the molded polymer tube within the filtration system.

The concept of this invention, and previously summarized, comprises the manufacture of a specific type of polymer tubing, as noted at 1, in FIG. 1, and its inter-engagement with a particularly stylized and configured grommet, as seen at 2, in FIG. 7, and the inter-fitting of the grommet, its supported tube, all secured through a transverse plate, as noted at 3, in FIG. 9.

As can be noted, in FIGS. 1-4, the configured polymer tube 1 is fabricated by pressure and heat molding of a polymer, such as polyethylene, which is formed by usage of the casting of said polymer beads, into a molding machine, which can mold the style of tube as noted, and as can be seen in said figures. Through the molding of these tubes of various beads, the beads are formed of polymer powder having generally a dimension in the vicinity of 115 um, or microns, and when compressed together, under heat and pressure, melt the beads into a solid configuration forming the style of tube as noted. The preferred tube includes a cylindrical portion 4 and as formed at its upper end an integral boss type flange 5, and as can be noted, the flange has a rather squared off configuration, having an annular flattened edge, as noted at 6, and which can conveniently cooperate with the grommet 2, when located therein, to lock the upper end of the tube into position, within said grommet 2, as can be seen in FIG. 10. As represented in FIG. 10, the grommet 2 engages above and below the upper end of the filtration tube at the flange 5 of the filter tube and prevents both upward and downward movement of the filtration tube relative to the grommet.

As previously summarized, the polymer beads of these dimensions when pressure molded are compressed together in the formation of a smooth cylindrical tube, smoothest on its outer surface, as at 7, designed for facilitating the slide off of any dust particles that accumulate against the outer surface of the tubing, when such polymer tubes are located within the filtration housing (not shown), but as noted in select prior applications as identified herein, so that the accumulated dust will slide off the tube, into the bottom of the filtration housing, leaving the surface of the variety of tubes that are clean, and receptive of the filtering of further incoming air, during its processing. These molded polyethylene beads have been designed to form uniform pores through their cylindrical walls, and said pores are in the range of approximately 5 um-10 um, (microns), which are smaller usually than the diameter of the incoming dust laden air, so that the air will pass for filtering therethrough, but the dust particles will remain upon the surface of the tubes, to assure the cleanliness of the air passing through the filtration system, is unadulterated when used for conveying of the various granular materials and powders that are being conveyed by the types of identified vehicles, in which the filtration system of this invention is utilized.

These FIGS. 1-4, generally provide a schematic appearance of the variety of beads as compressed together, during the compression molding process, but which still has some very small porosity, to allow for passage of dust laden air through them, to cleanse the air, but to separate the dust and keep it exteriorly of the tube length, as can be noted. Furthermore, the filtration process, as can be seen, is undertaken throughout the entire length of the tube, as noted, and as can be seen in FIG. 4, even the bottom of the tube is reasonably molded in a squared off configuration, as noted at 8, and therefore also provides a surface that can separate the dust from the moving air, during its cleansing process. Hence, the efficiency of usage of the molded tube for dust filtering purposes is essentially available over 100% of the formed cast molded polymer tube, as can be understood. As shown in FIG. 2 and FIG. 4, the squared off configuration of the bottom of the tube provides a surface 8 at the bottom of the tube that is oriented perpendicular to or at a right angle to the cylindrical wall 4 of the tube.

The flange 5, as noted in FIG. 3, does have its squared off annular edge, as noted at 6, to provide for its conveniently inter-fitting within the associated grommet, when the two are assembled, in preparation for their installation within the transverse plate 3 of the filtration system. However, the use of the word "flange" herein is not intended as being limited to the squared off configuration of the flange 5 represented in FIG. 10. It is intended that the word "flange" be interpreted as it's common understanding and definition as a projecting rim, collar or rib on an object, serving to strengthen or attach, or "a rib or rim for strength, for guiding, or for attachment to another object". Merriam-Webster.com Dictionary, Merriam-Webster, https://www.merriam-webster.com/dictionary/flange.

The grommet, as noted in FIG. 7, includes a length of cylindrical member, as can be seen at 9, it has an upper portion that forms a higher boss like member 10, which is wider diametrically than the plate aperture through which it inserts, as can be seen in FIG. 9, and interiorly thereof, the boss has a shaped groove, as noted at 11, and into which the tube flange 5 conveniently inserts, when the tube is inserted through the flexible grommet, and locates its upper end within the same, so that the flange 5 locks into position within the groove 11, to interconnect these two components together. As shown in FIG. 10, the squared off configuration of the groove 11 gives the groove a cylindrical outer wall and an annular top wall and annular bottom wall on opposite sides of the cylindrical outer wall. The annular top wall and the annular bottom wall are oriented perpendicular to or at a right angle to the cylindrical outer wall of the groove 11. As shown in FIG. 10, the squared off configuration of the flange 5 gives the flange an annular upper flange surface and an annular lower flange surface that are oriented perpendicular to or at a right angle to the annular edge surface 6 of the flange 5. As stated earlier and as shown in FIG. 10, the upper end of the tube 1 is integrally molded with the flange 5 of squared off construction. The flange 5 fits complementary in the groove 11 of the grommet 2 where the annular upper flange surface opposes and engages with the annular top wall of the groove 11 and the annular lower flange surface opposes and engages with the annular bottom wall of the groove 11 and prevent movement of the flange 5 in the groove 11 and prevent movement of the tube 1 in the grommet 2.

As can also be seen, the bottom of the grommet has at least one barb like configuration, as at 12, and this portion of the grommet is designed for fitting under the plate 3, when installed therein, and prevents the grommet from rising up at a significant distance within the plate, and holds its associated filtration tube in position, when subject to the operations and pressures of the air filtration system of this invention. It can also be seen that the bottom of the boss like flange 10, as at 13, biases against the upper surface of the plate 3, as can be noted in FIG. 9, and therefore, in combination with the barbs at 12, conveniently locks the grommet into position with the plate, and prevents its displacement, as when subjected to significant air pressure, during operations of the filtration system of this invention. Furthermore, as can be seen, there are a series of integral O-type ring like members 14 that engage against the inner edge of the plate aperture, to assure that the air will not bypass the grommet, and to seal the grommet into position within the structured plate, in addition to its supported filtration tube, as can be understood.

Hence, heretofore, when the filter tubes just had a crimped upper edge, the pressure of the air sometimes uncrimps the upper end of the tube, and pushes the tube from the grommet, thereby substantially decreasing if not eliminating the ability of the filtration system to filter out the dust particles from the passing air, during usage. With this construction of the components as defined herein, there is little potential for the tube coming free from the grommet, or grommet coming free from its suspension within the aperture of the associated plate 3, during its usage.

FIGS. 5 and 6 provide enlarged sectional views of the air filtration tube 4 with its smooth outer surface 7, and the various pores, as noted at 15, while being expanded in size to provide for its showing of the porosity of the tube, as along its outer surface 7, and through the interior thereof, while appearing to be sizable of passage, are actually in that porosity range as previously described as between about 5 um-10 um (microns) in size. It can also be seen at the bottom of the tube, as noted at 8, also has those pores, as can be seen at 16, provided therethrough, to also furnish air filtration at the bottom of the tube, as can be understood. These pores also are within the same micron range as previously described for the side walls of the cylindrical air filtration tube 4, as previously reviewed.

Figure 8:
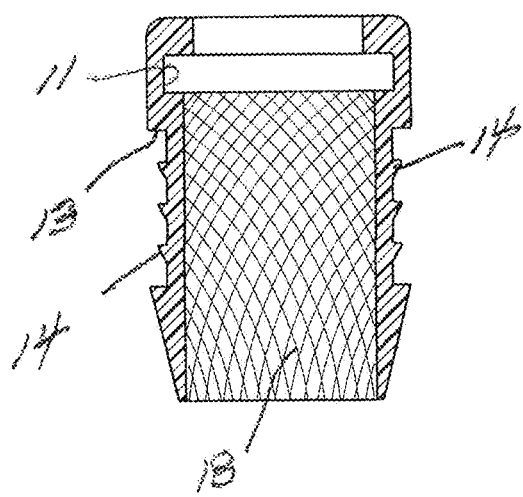
FIG. 8 is a longitudinal sectional view of the grommet taken along the line 8-8 of FIG. 7.

Also, as can be seen in FIG. 8, the interior 17 of the grommet has a knurled interior surface, as can be seen at 18, and this is provided for securing the upper end of the filtration tube therein when installed as noted in FIG. 10, to assure that the upper end of the tube remains in place, and cannot be displaced by means of any highly pressurized air, that may be passing through the tube, during the air filtration process.

Figure 11:
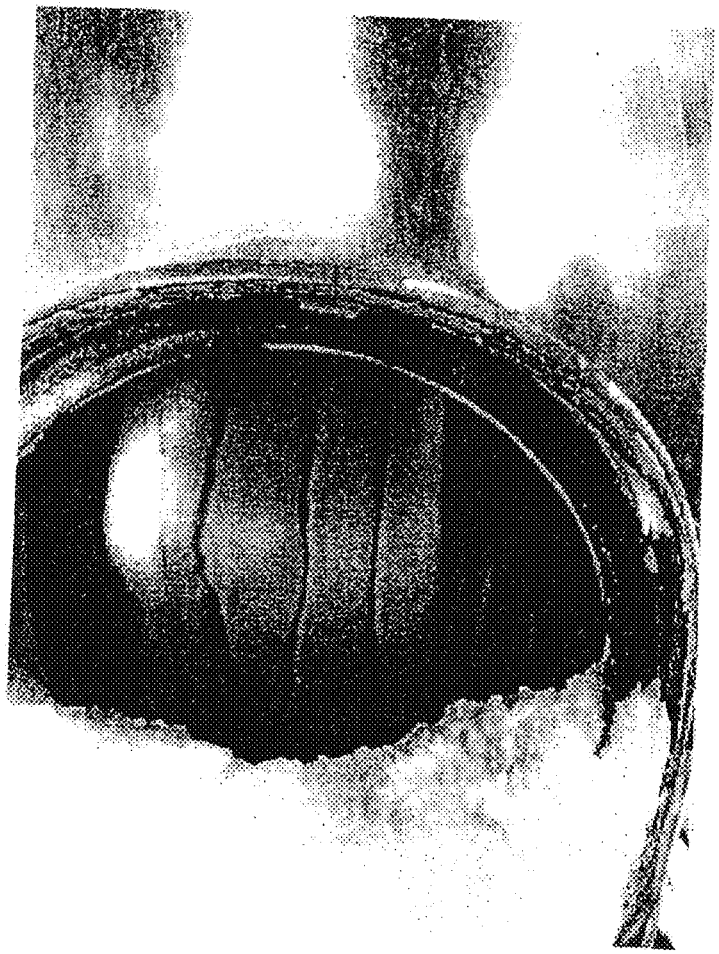
FIG. 11 is a view looking interiorly of the air filtration system utilizing the tubes of this current invention and showing how the dust particles accumulated upon the surface of the tubes creating depth filtration during performance of a filtration procedure.
Figure 12:
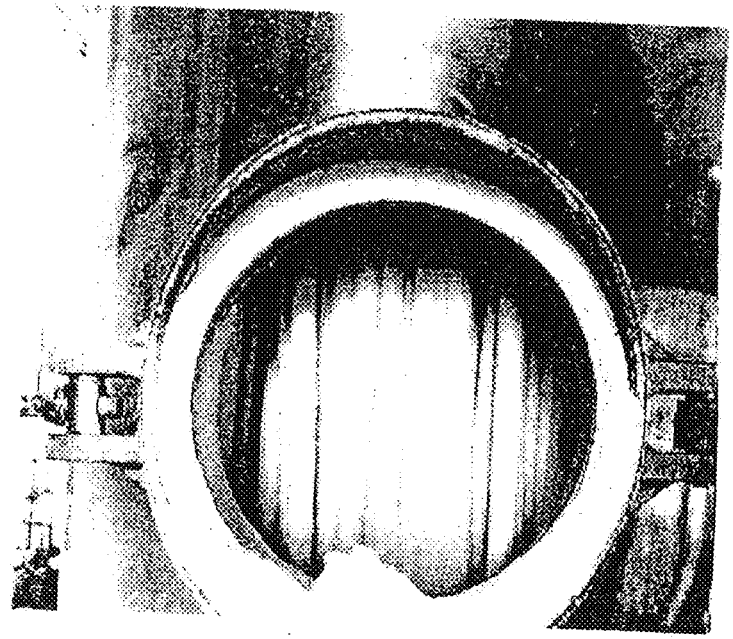
FIG. 12 shows usage of the tubes of this current invention and how after the cleaning process, the tubes are completely clean, with the dust particles filtered falling from the smooth surface of such formed molded tubes during the air filtration process, allowing the clean filter tubes to perform at the same efficiency as new tubes.

FIG. 11 shows the tubes of the current invention, but as noted, when viewed after a filtration process, the dust particles have accumulated on the exterior surface of the tubes. FIG. 12 shows the usage of the tubes of the current invention, located within the filtration housing, at the end of a cleaning process, and as can be noted, the tubes are completely clean, because of the smooth outer surface of the tubes, when formed, containing those various miniscule pores, that does not allow for the dust particles to accumulate within the tubes, or wedge therein, but keep the dust upon the outer surface of the tubes, and which when the filtration process is completed, such accumulated dust just simply falls off of the tubes of the entire filtration system, as noted.

Basically, the concept of this invention is to utilize a particular range of polyethylene beads, in powder form, somewhere in the vicinity of 115 um (microns), which when molded under heat and pressure, forms those miniscule air passing pores, within that 5 um-10 um range, so that air will pass and be cleansed, but that dust and any other debris will remain exteriorly thereof, and be filtered from the clean air as required for further usage in conveying of the identified type of granular materials, as previously explained.

Variations or modifications to the subject matter of this invention may occur to those skilled in the art upon review of the development as explained herein, and such variations, if within the spirit of this invention, are intended to be encompassed within the scope of any claims to patent protection issuing herein. The definition of the invention in the Specification, and its depiction in the Drawings, are set forth for illustrative purposes only

We claim:

1. An air filtering system comprising:
   a filtration tube;
   a cylindrical wall of the filtration tube, the cylindrical wall having a length with a top end and an opposite bottom end;
   a flange integral with the top end of the cylindrical wall and the filtration tube, the flange projecting outwardly from the top end of the cylindrical wall;
   a grommet, the grommet being formed as a cylindrical member with a cylindrical configuration, the grommet having an interior surface with a cylindrical configuration, the grommet having an upper portion;
   a boss extending diametrically outward from the upper portion of the grommet and extending around the cylindrical configuration of the grommet, the boss being diametrically wider than an aperture through a transverse plate in a filter housing of the air filtering system;
   a groove in the interior surface of the grommet and in an interior of the boss, the groove having an annular shape into which the flange of the filtration tube is inserted with the filtration tube inserted through the grommet, the groove being configured to locate the top end of the cylindrical wall of the filtration tube in the groove and lock the flange in position in the groove.

2. The filtration system of claim 1, further comprising:
   the groove in the interior of the boss being configured to receive the flange in the groove and prevent both upward and downward movement of the filtration tube relative to the grommet; and
   the flange having an annular configuration with an annular outer edge surface that is configured to be positioned in and cooperate with the groove in the boss when the flange is located in the groove and lock the top end of the cylindrical wall in position in the grommet.

3. The filtration system of claim 1, further comprising:
   the groove in the interior of the boss having an interior configuration with a cylindrical outer wall in the groove, an annular top wall in the groove and an annular bottom wall in the groove, the annular top wall and annular bottom wall being positioned on opposite sides of the cylindrical outer wall of the groove; and
   the flange having an exterior configuration that is complementary to the interior configuration of the groove whereby the flange engages against the annular top wall of the groove and the annular bottom wall of the groove with the flange located in the groove.

4. The filtration system of claim 3, further comprising:
   the exterior configuration of the flange gives the flange an annular upper flange surface and an annular lower flange surface; and
   with the filtration tube inserted in the grommet the annular upper flange surface opposes and engages with the annular top wall of the groove and the annular lower flange surface opposes and engages with the annular bottom wall of the groove.

5. The filtration system of claim 1, further comprising:
   the grommet has barbs at a lower portion of the cylindrical member, the barbs are positioned diametrically wider than the aperture through the transverse plate of the filtration system.

6. The filtration system of claim 1, further comprising:
an O-ring on an exterior surface of the grommet, the O-ring being integral with the grommet and the O-ring engaging against an interior cylindrical surface of the aperture through the transverse plate forming a seal at the O-ring engagement with the interior surface of the aperture.

7. The filtration system of claim 1, further comprising:
uniform pores through the cylindrical wall of the filtration tube, the uniform pores having dimensions in a range of 5 microns to 10 microns.

8. An air filtering system comprising:
a filtration tube;
a cylindrical wall of the filtration tube, the cylindrical wall having a length with a top end and an opposite bottom end;
a flange integral with the top end of the cylindrical wall and the filtration tube, the flange projecting outwardly from the top end of the cylindrical wall;
a grommet, the grommet being formed as a cylindrical member with a cylindrical configuration, the grommet having an upper portion;
a boss extending diametrically outward from the upper portion of the grommet and extending around the cylindrical configuration of the grommet;
a groove in an interior of the boss, the groove being configured for insertion of the flange of the filtration tube into the groove when the filtration tube is inserted through the grommet, the groove being configured for locating the top end of the cylindrical wall of the filtration tube in the groove and locking the flange in position in the groove.

9. The filtration system of claim 8, further comprising:
the groove in the interior of the boss being configured for receiving the flange in the groove and preventing both upward and downward movement of the filtration tube through the interior of the boss; and
the flange having an annular configuration with an annular outer edge surface that is configured to be positioned in and cooperate with the groove in the interior of the boss when the flange is inserted in the groove and locks the top end of the cylindrical wall in position in the grommet.

10. The filtration system of claim 8, further comprising:
the groove in the interior of the boss having an interior configuration with a cylindrical outer wall in the groove, an annular top wall in the groove and an annular bottom wall in the groove, the annular top wall and annular bottom wall being positioned on opposite sides of the cylindrical outer wall of the groove; and
the flange having an exterior configuration that is complementary to the interior configuration of the groove whereby the flange engages against the annular top wall of the groove and the annular bottom wall of the groove when the flange is inserted in the groove.

11. The filtration system of claim 10, further comprising:
the exterior configuration of the flange gives the flange an annular upper flange surface and an annular lower flange surface; and
with the filtration tube inserted in the grommet the annular upper flange surface opposes and engages with the annular top wall of the groove and the annular lower flange surface opposes and engages with the annular bottom wall of the groove.

12. The filtration system of claim 8, further comprising:
the boss is diametrically wider than an aperture through a transverse plate of a filtration system; and
the grommet has barbs at a lower portion of the cylindrical member, the barbs are positioned diametrically wider than the aperture through the transverse plate of the filtration system.

13. The filtration system of claim 12, further comprising:
an O-ring on an exterior surface of the grommet, the O-ring engaging against an interior cylindrical surface of the aperture through the transverse plate and forming a seal at the O-ring engagement with the interior surface of the aperture.

14. The filtration system of claim 13, further comprising:
the boss, the barbs and the O-ring are all integral with the grommet.

15. The filtration system of claim 8, further comprising:
uniform pores through the cylindrical wall of the filtration tube, the uniform pores having dimensions in a range of 5 microns to 10 microns.

16. An air filtering system comprising:
a filtration tube;
a cylindrical wall of the filtration tube, the cylindrical wall having a length with a top end and an opposite bottom end;
a grommet, the grommet being formed as a cylindrical member with a cylindrical configuration, the grommet having an interior surface with a cylindrical configuration extending through the grommet, the grommet having an upper portion;
a boss extending diametrically outward from the upper portion of the grommet and extending around the cylindrical configuration of the grommet, the boss being diametrically wider than an aperture through a transverse plate in a filter housing of the air filtering system;
a groove in the interior surface of the grommet and in an interior of the boss, the groove having an annular shape that is configured for receiving the top end of the filtration tube in the annular shape of the groove in response to the filtration tube being inserted through the cylindrical configuration of the interior surface of the grommet, the groove being configured to receive the top end of the filtration tube in the groove and lock the top end of the filtration tube in position in the groove.

17. The filtration system of claim 16, further comprising:
the flange having an annular configuration with an annular outer edge surface that is configured to be positioned in and cooperate with the groove in the boss when the flange is received in the groove and lock the top end of the cylindrical wall in position in the grommet.

18. The filtration system of claim 16, further comprising:
the groove in the interior of the boss having an interior configuration with a cylindrical outer wall in the groove, an annular top wall in the groove and an annular bottom wall in the groove, the annular top wall and annular bottom wall being positioned on opposite sides of the cylindrical outer wall of the groove; and
the top end of the filtration tube having an exterior configuration that is complementary to the interior configuration of the groove whereby the top end of the filtration tube is configured to engage against the annular top wall of the groove and the annular bottom wall of the groove when the top end of the filtration tube is located in the groove.

19. The filtration system of claim 16, further comprising:
the exterior configuration of the top end of the filtration tube gives the top end of the filtration tube an annular upper surface and an annular lower surface; and when the filtration tube is inserted in the grommet the annular upper surface opposes and engages with the annular top wall of the groove and the annular lower surface opposes and engages with the annular bottom wall of the groove.

20. The filtration system of claim 16, further comprising:
an O-ring on an exterior surface of the grommet, the O-ring being integral with the grommet and being dimensioned to engage against an interior cylindrical surface of the aperture through the transverse plate and form a seal at the O-ring engaged with the interior surface of the aperture.

* * * * *